March 17, 1953 — R. A. SANDBERG — 2,631,470
STRAIGHT PULL BRAKE LEVER STRUCTURE
Filed Jan. 16, 1951 — 3 Sheets-Sheet 1
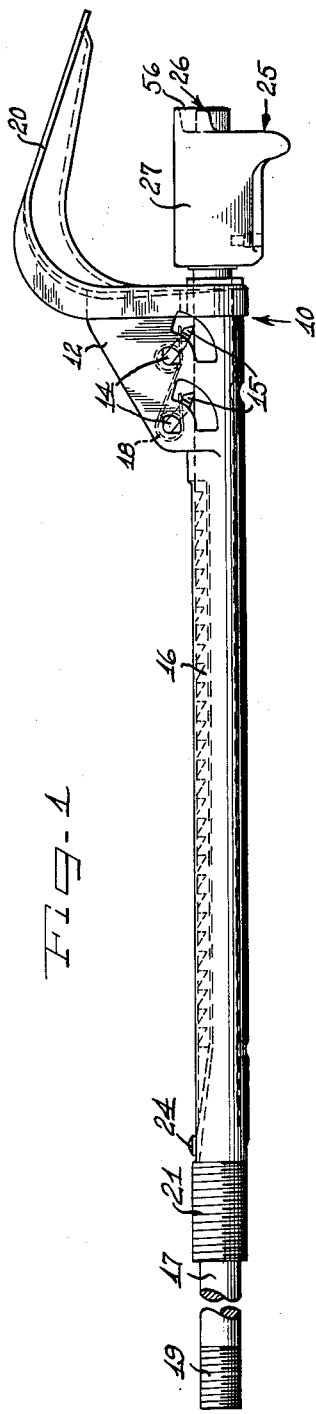
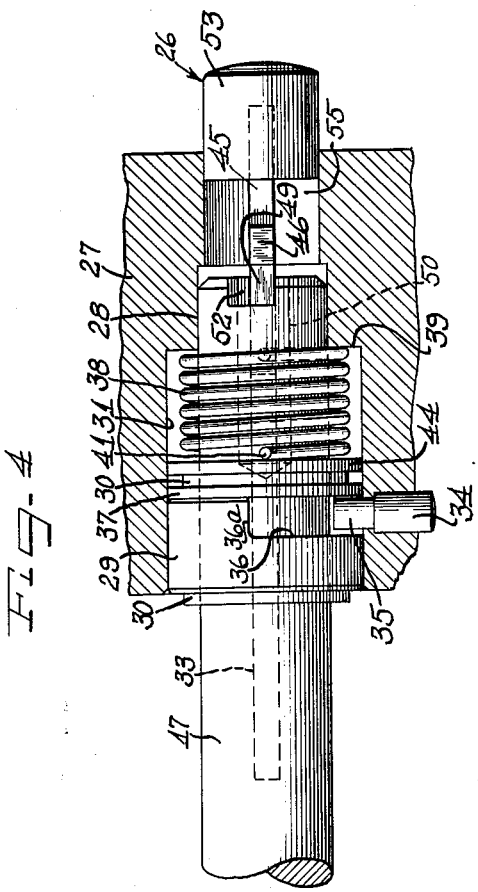
Inventor
Ray A. Sandberg March 17, 1953 R. A. SANDBERG 2,631,470
STRAIGHT PULL BRAKE LEVER STRUCTURE
Filed Jan. 16, 1951 3 Sheets-Sheet 2
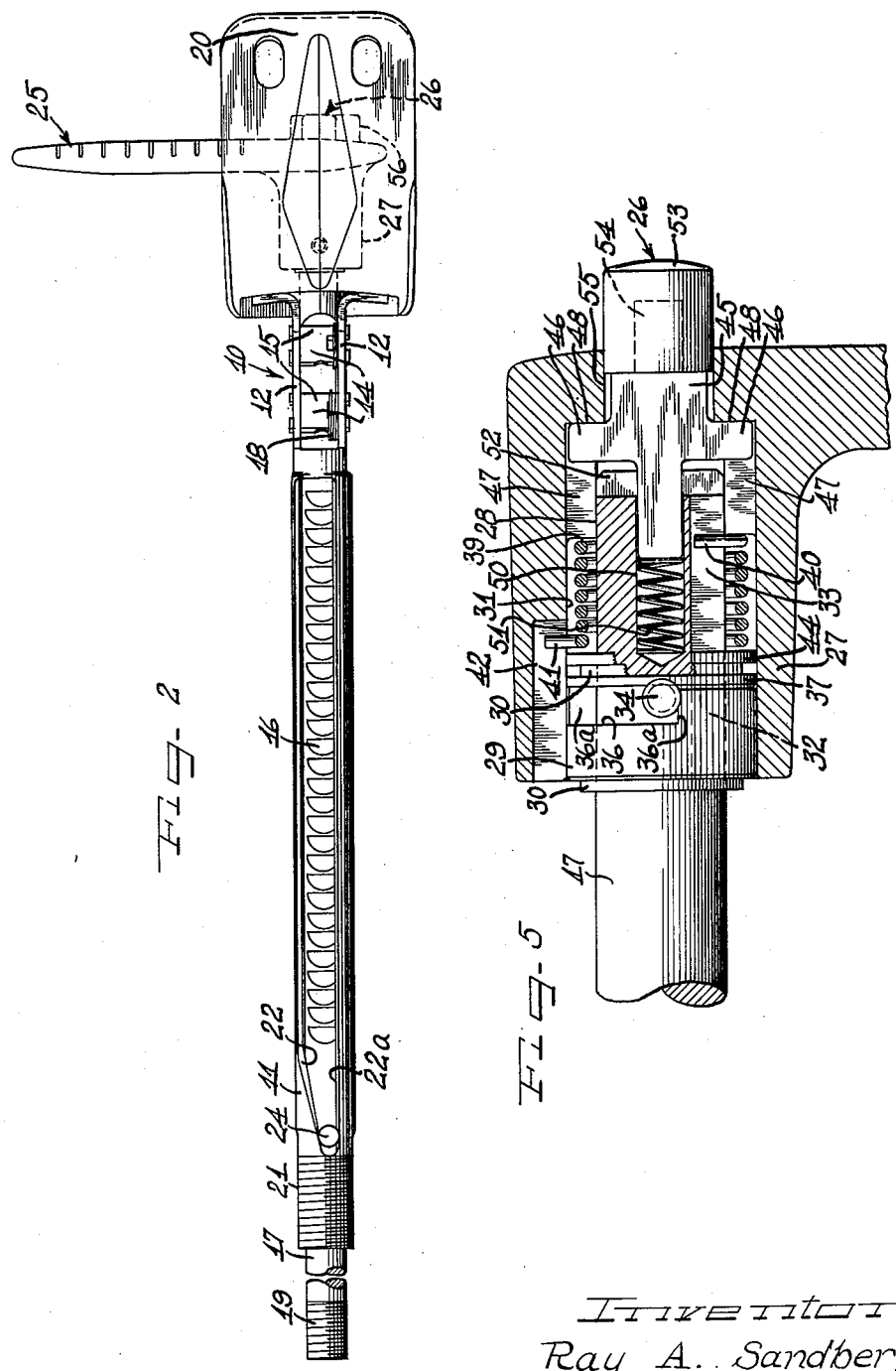
Inventor
Ray A. Sandberg March 17, 1953 R. A. SANDBERG 2,631,470
STRAIGHT PULL BRAKE LEVER STRUCTURE
Filed Jan. 16, 1951 3 Sheets-Sheet 3
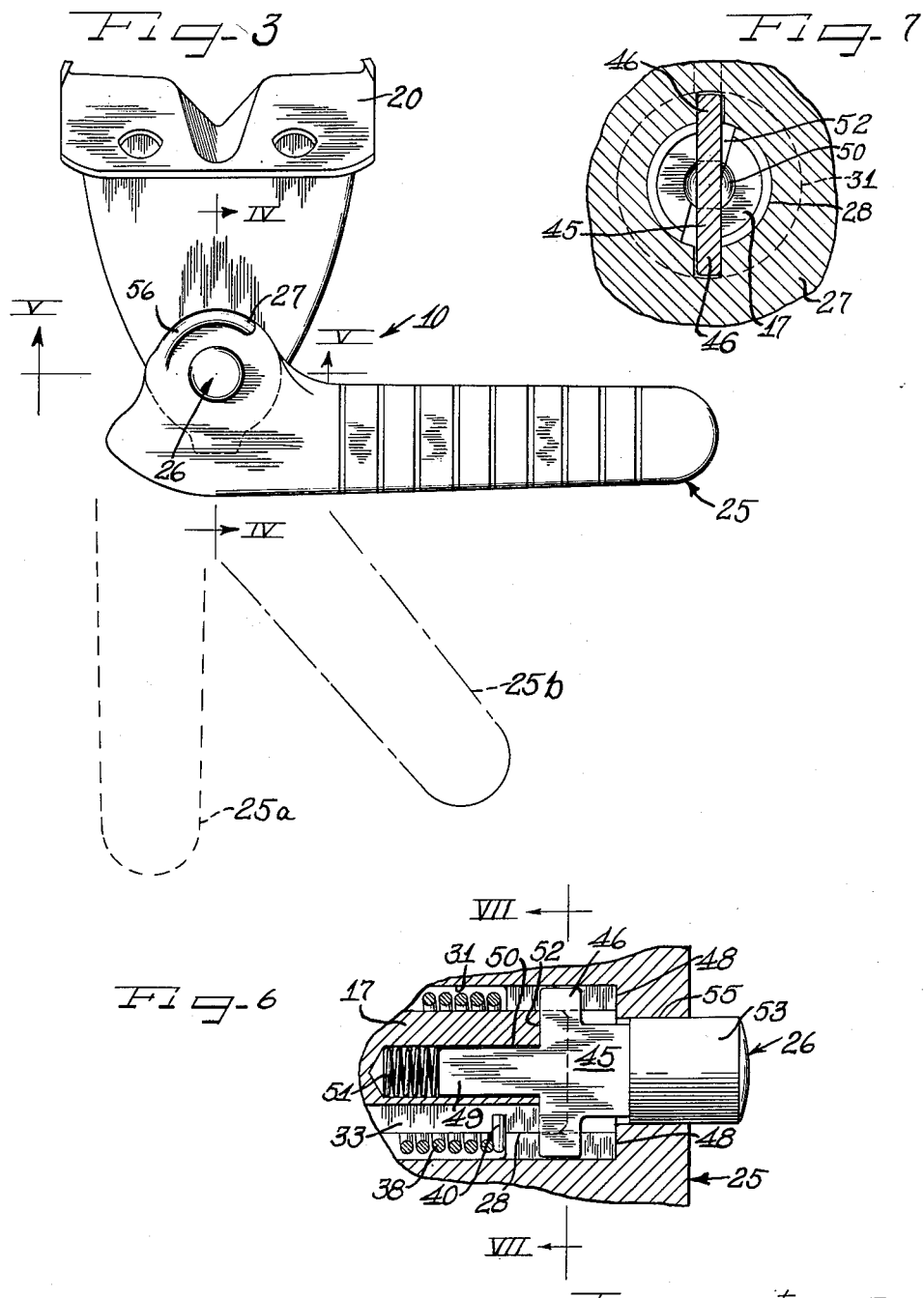
Inventor
Ray A. Sandberg Patented Mar. 17, 1953

2,631,470

UNITED STATES PATENT OFFICE 2,631,470

STRAIGHT PULL BRAKE LEVER STRUCTURE

Ray A. Sandberg, Waukegan, Ill., assignor to Houdaille-Hershey Corporation, Detroit, Mich., a corporation of Michigan Application January 16, 1951, Serial No. 206,189

16 Claims. (Cl. 74—503)

This invention concerns improvements in a straight pull brake lever structure, and more particularly relates to a straight pull brake lever structure for actuating the emergency brakes of a vehicle or the like.

In the parking brake lever art there has been a constant striving to obtain greater ease of operation for not only setting but also for release of the emergency brake. In one popular form of brake lever wherein a reciprocable and rotary ratchet pull rod retaining pawl arrangement is used, easy release is accomplished by turning the rod by means of a handle accessible at the rear of the rod. Accidental release of the emergency brake as by inadvertent bumping against the handle thereof by a small child or even an animal left in the vehicle may easily result in a serious accident and damage to the vehicle and other property, as well as danger to human life.

It is, therefore, an object of the present invention to provide an improved straight pull brake lever structure including a safeguard against accidental release.

Another object of the invention is to provide an improved straight pull brake lever structure including an actuating handle having a safety release connection with a pull rod.

A further object of the invention is to provide a substantially foolproof brake release mechanism in a straight pull brake lever structure to prevent inadvertent release of the emergency brakes of a vehicle.

Still another object of the present invention is to provide an emergency brake actuating structure for a vehicle embodying a simplified and improved safety release mechanism requiring multi-digital manipulations for releasing the brake.

Other objects, features and advantages of the present invention will be apparent from the following detailed description of a preferred embodiment, for purpose of example only, as shown in the accompanying drawings, in which:

Figure 1 is a side elevational view of a straight pull brake lever structure according to the present invention;

Figure 2 is a top plan view of the brake lever structure shown in Figure 1;

Figure 3 is an enlarged rear end elevational view of the brake lever structure and showing the range of swinging movement of the actuating handle;

Figure 4 is an enlarged fragmentary sectional view, with parts in elevation, taken substantially along line IV—IV of Figure 3;

Figure 5 is an enlarged fragmentary sectional view, with parts in elevation, taken substantially along line V—V of Figure 3;

Figure 6 is a fragmentary sectional view similar to Figure 5, but showing the interlock mechanism in operated position; and Figure 7 is a fragmentary sectional view taken substantially along line VII—VII of Figure 6.

In Figures 1 and 2 is illustrated a straight pull brake lever structure 10 for actuating the emergency brakes of a vehicle such as an automobile or a truck. The brake lever structure 10 includes a support and guide tube 11 having at the rear end portion a pair of upstanding spaced parallel legs or flanges 12 which pivotally support a pair of ratchet pawls 14 in tandem relationship. The pawls 14 have wedge-like free end portions 15 which are adapted to engage successively a plurality of ratchet teeth 16 formed in series relation longitudinally along a peripheral portion of a brake actuating pull rod 17 which is slidably disposed in the supporting and guiding tube 11. The pawls 14 are resiliently urged downwardly to engage the ratchet teeth 16 by means of a wire biasing spring 18 operatively encircling upper pivot arm portions of both the pawls 14 and having the end portions thereof engaging respective arms of the pawls.

In order to attach the pull rod 17 to an emergency brake operating means such as a cable (not shown), the forward end portion of the rod may be threaded as indicated at 19.

For attaching the supporting and guiding tube 11 to a portion of the vehicle such as the instrument panel (not shown), an escutcheon or attachment bracket 20 of modified L-shaped construction is fixedly attached to the rear end portion of the tube. To provide means for attaching the tube 11 to the dash panel of the vehicle, the forward end portion of the tube may be threaded as indicated at 21.

For limiting longitudinal and rotary movement of the rod 17 relative to the tube 11, a longitudinal slot 22 is formed along the top surface portion of the tube and a guide and stop pin 24, fixedly attached to the rod, has its distal end portion disposed in the slot for cooperation with the defining edges thereof. The pin 24 is normally guided longitudinally by riding along a longitudinal guide edge 22a of the slot 22. The slot edge opposite the guide edge 22a has a short forward end portion converging toward the guide edge to hold the pin 24 in its vertical position when the rod 17 is in the full forward or emergency brake release position.

For permitting complete disengagement of the pawls 14 from the teeth 16, the greater portion of the length of the slot 22 from its rear end is of sufficient width to allow turning of the pull rod 17 with respect to the tube 11 for approximately 60° from the vertical. The opposed defining sides of the slot 22 form positive stop edges engageable by the pin 24 to limit turning movement of the rod 17. The rear end defining portion of the slot 22 forms a positive stop in connection with the pin 24 to limit the rearward longitudinal movement of the rod 17.

According to the present invention, safety release means are provided to prevent accidental release of the brakes and to allow easy intentional release thereof. In the present instance such means comprise an actuating lever or handle 25 pivotally mounted on the rearward end portion on the pull rod 17 together with a manually operable clutch or interlock mechanism 26. To pivotally mount the handle 25, it has an integral boss or housing 27 with a forwardly opening bore 28 receiving the rearward end portion of the rod 17 in pivotal relationship therein.

For retaining the handle 25 on the rearward end portion of the rod 17, a stop sleeve 29 is disposed over part of the rod end portion and is retained against axial movement thereon by a pair of snap rings 30 snapped into respective annular grooves in the rod end portion adjacent each end of the sleeve 29. For additionally pivotally supporting the rod end portion relative to the handle 25, a coaxial counterbore 31 is formed in the forward end of the housing 27 with a portion of the wall of the counterbore in slidable conforming contact about the radially outward surface of the sleeve 29.

To prevent rotational movement of the sleeve 29 relative to the rod 17, an integral key 32 (Figure 5) is formed radially inwardly from the inward surface of the sleeve 29 and engages in a longitudinal radially opening slot or groove 33 formed in the rearward end portion of the rod 17 and extending from its rear end to a point forwardly of the sleeve 29.

In order to provide a limited pivotal range of movement between the handle 25 and the rod 17 and to prevent axial movement of the handle on the rod, a stop pin 34 is inserted through the bottom wall portion of the handle boss 27 and has an inward end portion 35 disposed in a cut-out or groove 36 extending for a portion of the rearward periphery of the sleeve 29. A thrust bearing washer 37 is disposed between the rearward end of the sleeve 29 and the rearward split ring 30 to confine the end portion 35 of the pin 34 between the bearing washer and the forward defining edge of the groove 36. The washer 37 and the forward defining edge of the groove 36 coact with the pin 34 to positively prevent consequential axial movement of the handle 25 with respect to the rod 17 but to allow pivotal movement therebetween. The pivotal movement is positively limited by the end edge defining portions of the groove 36 providing stop shoulders 36a in cooperation with the pin end portion 35. This pivotal movement is preferably limited to approximately 90° as indicated between the dash outline 25a and the solid outline of the handle 25 in Figure 3.

Means are provided for resiliently biasing the handle 25 into a normal position such as the substantially horizontal position shown in solid outline in Figure 3. In the present instance such means comprise a coiled torsion spring 38 disposed about the rod 17 between the sleeve 29 and a shoulder 39 formed at the juncture between the bore 28 and the counterbore 31. An inwardly directed end portion 40 of the spring 38 is disposed in the rod groove 33 and a radially outwardly directed opposite end portion 41 of the spring 38 is disposed in a longitudinal groove 42 formed in the wall of the counterbore portion 31. To prevent interference between the rearward split ring 30 and the forward end of the spring 38 a washer 44 is disposed therebetween.

In order to effect coupling between the interlock mechanism 26 and the handle 25 a key portion 45 of flat plate construction has a pair of integral, oppositely radially extending arms or ears 46 slidably engaged in a pair of opposed grooves or guideways 47 formed in the wall of the bore 28 (Figures 5 and 6). The ears 46 normally abut rearward stop shoulders 48 at the rear ends of the guideways 47.

To provide means to resiliently urge the key ears 46 against the shoulders 48 the key 45 has an integral forwardly extending guide and abutment or nose 49 extending into a guide bore 50 formed axially in the rearward end portion of the rod 17. A coil compression spring 51 is disposed between the forward end of the abutment nose 49 and the bottom of the axial bore 50 to resiliently urge the interlock mechanism 26 rearwardly.

For providing a selective positive coupling between the interlock mechanism 26 and the rod 17 a transverse endwise interlock slot 52 is formed across the rearward end face of the rod 17. The forward end portion of the key 45, at both sides of the abutment nose 49, is adapted to engage in the interlock slot 52 when the interlock mechanism 26 is urged forwardly and the handle 25 is in substantially horizontal position. To allow for some play or lost motion in engagement of the key 45 in the interlock slot 52 when the handle 25 is depressed slightly, as by inadvertent initial pressure of the operator's hands, the interlock slot has radially outwardly divergent defining sides affording clearance, herein shown at approximately 15° angles. This allows for a limited radial play of the key in the slot (Figure 7).

In order to permit selective manual actuation of the interlock mechanism 26, a push button 53 is fixedly attached to an integral rearwardly extending connecting portion or stem 54 of the key 45. The push button 53 is slidably disposed in a short rearward bore 55, coaxial with and of slightly smaller diameter than the bore 28.

An additional safety feature is incorporated to further protect against inadvertent release of the emergency brakes. Herein, this additional safety feature is embodied in a guard 56 for protecting against accidental depressing of the interlock push button 53 and is formed as an integral arcuate hood extending rearwardly substantially the same distance as the button 53 from the rear end portion of the handle hub or housing 27. The guard 56 is formed along the upper peripheral portion of the housing 27 as seen in the normal horizontal position in Figure 3. A sufficient clearance is provided between the opposed surfaces of the guard 56 and the button 53 to allow easy accommodation of thumb or finger for intentional depressing of the button even when the operator is wearing bulky gloves.

In operation, the actuating handle 25 may be pivoted approximately 90° as shown in Figure 3 without rotating the rod 17 if the interlock actuation button 53 is not depressed. This provides a safety factor in that accidental depressing of the actuating handle will not cause release of the emergency brakes. The handle 25 will always return to a substantially horizontal position when released because of the biasing action of the spring 38. If the emergency brake has been set so that the ratchet pawls 14 are engaged with the ratchet teeth 16, the brake may be readily and easily released by grasping the handle 25, depressing the interlock actuating button 53, and rotating the handle 25 to a position indicated by the phantom dot-dash outline 25b in Figure 3. Since in this operated position the interlock mechanism 26 has engaged the pull rod 17, the rod will rotate as the handle is rotated and the ratchet pawls 14 will be released from the teeth 16 to allow movement of the pull rod in a forward or brake releasing direction.

From the foregoing description it will be understood that the present invention provides a simplified and improved straight pull brake lever construction for actuating the emergency brakes of a vehicle or the like in which the emergency brakes will not be inadvertently released. Release of the brakes requires depression of a release button to engage a key in an interlock slot and subsequent rotation of an actuating handle while the button is held in the depressed position. Thus, a two-phase or double-manual operation is required to effect release of the brakes. Neither inadvertent swinging of the handle 25 nor accidental depression of the button 53 alone will cause release of the brakes, and the likelihood of both of these operations occurring accidentally and simultaneously is quite remote. To further protect against accidental brake release by reducing the likelihood of inadvertent depression of the button 53, the guard hood 56 is provided.

The present brake lever or actuating assembly may be easily manufactured and assembled for a relatively low cost, and the assembly is easily operated both in the brake releasing and brake actuating directions.

It will be understood that modifications and variations may be effected without departing from the scope of the novel concepts of the present invention.

I claim as my invention:

1. In a straight pull brake lever structure including an actuating rod slidably and pivotally mounted in a support and mechanism for retaining the rod in incremental brake setting positions when the mechanism is engaged, said mechanism being disengageable by rotation of the rod, means for rotating said rod to disengage said mechanism comprising a handle pivotally mounted on said rod, and means for selectively locking the handle to said rod for rotating the rod in response to manual rotation of said handle.

2. A straight pull brake lever structure comprising a support, a brake actuating rod slidably and pivotally disposed in said support and mechanism for retaining the rod in incremental brake setting positions, said mechanism being disengageable by rotation of said rod to permit longitudinal movement of said rod in a brake releasing direction, a handle pivotally mounted on said rod, and manually operable interlock means including a reciprocable key for selectively locking said handle to said actuating rod for rotating said rod to disengage said mechanism.

3. A straight pull brake lever structure for actuating the brakes of a vehicle, comprising a support adapted to be fixedly attached to the vehicle, an actuating assembly slidably and pivotally mounted in said support, ratchet mechanism for retaining the assembly in incremental brake setting positions, said ratchet mechanism being disengageable by rotation of said assembly to permit longitudinal movement of said assembly in a brake releasing direction, a handle pivotally attached to said actuating assembly, a manually-operable key slidably and non-rotatably mounted in said handle, said actuating assembly having a transverse slot for receiving a portion of said key to selectively lock said handle relative to the assembly, whereby rotation of said handle rotates said actuating assembly to disengage said ratchet mechanism when said key is engaged in said slot.

4. A straight pull brake lever structure including an actuating pull rod slidably and pivotally mounted in a supporting and guiding tube with ratchet teeth formed on the pull rod and engaged by pawl means movably mounted on said support tube to retain the rod in incremental brake setting positions and the pawl means being disengaged from the teeth upon rotation of the rod to allow movement of the rod in a brake releasing direction, means for selectively pivoting said pull rod comprising a handle pivotally mounted on said rod, a manually operable key slidably and non-rotatably mounted in said handle, said rod having a transverse end slot for receiving a portion of said key to lock said handle relative to said rod, whereby rotation of said handle rotates said rod when said key is engaged in said slot.

5. A straight pull brake lever structure for actuating the emergency brakes of a vehicle, comprising a support adapted to be fixedly attached to the vehicle, an actuating assembly slidably and pivotally mounted in said support, ratchet means between said support and said assembly for permitting incremental brake setting movement of the assembly, said ratchet means being disengageable by pivoting said assembly to permit movement of said actuating assembly in a brake releasing direction, a handle pivotally mounted on said assembly, a key slidably and non-rotatably mounted in said handle, a transverse end slot formed in said assembly and engageable by said key to selectively lock said handle relative to said assembly, a spring resiliently biasing said key to non-engaged position, and manually operable means for moving said key into engagement in said actuating assembly slot.

6. A straight pull brake lever structure for actuating the emergency brakes of a vehicle, comprising a supporting and guiding tube adapted to be fixedly attached to a vehicle and having pawl means movably mounted thereon, said tube having a longitudinal slot therein, a brake actuating pull rod slidably and pivotally disposed in said tube and having a plurality of ratchet teeth engageable with said pawl means, a transverse guide portion on said rod and movable in said slot, said pawl means being engageable with said teeth to retain the rod in incremental brake setting positions when said guide portion is disposed adjacent one longitudinal defining edge of said slot, said pawl means being disengaged from said teeth when said guide portion is adjacent the other longitudinal defining edge of said slot to permit movement of said rod in a brake releasing direction, and means for selectively pivoting said rod including a handle pivotally mounted on said rod and manually operable means for selectively locking said handle to said rod for rotating the rod in response to manual rotation of said handle.

7. In a straight pull brake lever structure including an actuating assembly pivotally and slidably mounted in a support and mechanism for permitting longitudinal incremental brake setting movement of the assembly when the mechanism is engaged and said mechanism being disengageable by rotation of the actuating assembly, means for disengaging said mechanism comprising a member pivotally mounted on said actuating assembly for pivoting over a predetermined range, a spring resiliently biasing said member toward one end of said range, a manually operable interlock for selectively locking said member relative to said actuating assembly when said member is at substantially said one end of said pivotal range, whereby said member is freely pivotal in said range independently of said actuating assembly when said interlock is disengaged, and whereby pivoting of said member pivots said actuating assembly when said interlock is engaged to disengage said mechanism and permit movement of said assembly in a brake releasing direction.

8. In a straight pull brake lever structure including a support with an actuating rod slidably and pivotally mounted therein with ratchet mechanism for retaining the rod in incremental brake setting positions and whereby rotation of said actuating rod disengages said ratchet mechanism to allow movement of the rod in a brake releasing direction, means for rotating said actuating rod comprising a member pivotally mounted on said rod, a key slidably and non-rotatably mounted in said member and having an elongated end portion, an axial bore in one end portion of said rod slidably receiving said key end portion, and a compression spring disposed between said key end portion and the bottom of said bore to resiliently urge said key away from said rod, said rod having a transverse end slot for receiving a portion of said key therein to selectively lock said member relative to said rod.

9. In a straight pull brake lever structure for a vehicle, including an actuating rod slidably and pivotally mounted in a support and ratchet means to permit incremental brake setting movement of the rod, means for rotating said rod to disengage said ratchet mechanism and permit longitudinal movement of the rod in a brake releasing direction, said means comprising a handle pivotally mounted on one rod end portion, and a manually operable key slidably and non-rotatably mounted in said handle, said rod having a transverse endwise slot for receiving said key therein to selectively lock said handle with respect to said rod, said slot allowing limited play between the defining walls thereof and said key to permit ready engagement of the key in the slot.

10. In a brake lever structure including an actuating rod slidably mounted on a support with ratchet mechanism for permitting longitudinal incremental brake setting movement of said rod and with said rod pivotally disposed in said support to permit disengagement of said ratchet mechanism to allow longitudinal movement of said rod in a brake releasing direction, means for pivoting said rod comprising a handle pivotally mounted on said rod, a sleeve substantially fixedly mounted on said rod, a stop pin associated with said handle and said sleeve to positively limit the range of pivotal movement of said handle, and an interlock for selectively locking said handle relative to said rod, said interlock being arranged for engagement with said rod at one end of the range of pivotal movement of said handle.

11. A straight pull brake lever structure for actuating the emergency brakes of a vehicle, comprising a support fixedly attached to said vehicle, a brake actuating rod slidably and pivotally disposed in said support, ratchet mechanism for retaining the rod in incremental brake setting positions and being disengageable by rotation of said rod to permit movement of the rod in brake releasing direction, a handle pivotally mounted on said rod, a sleeve substantially fixedly mounted on said rod, a stop pin associated with said handle and said sleeve to limit pivotal movement of the handle to a predetermined range, a spring resiliently urging said handle toward one end of said pivotal range, said rod having a transverse endwise slot therein, a key slidably and non-rotatably mounted in said handle and having a portion selectively engageable in said slot for locking said handle relative to said rod, a compression spring disposed between a portion of said rod and said key to urge the key out of said slot, and manually operable means for actuating said key to engage the same in said slot.

12. In combination in a safety straight pull brake lever assembly, a reciprocable and rotary member, an elongated handle having a hub portion rotatably mounted on said member but retained against axial displacement for pulling said member in one reciprocable direction, automatically releasable push button interlock means for connecting the hub of the handle and said member for joint rotation, said interlock means including a push button extending from said handle, and an integral arcuate guard hood extending rearwardly from said hub portion in adjacent spaced relation to said push button to guard against accidental actuation of the push button.

13. In combination in a safety straight pull brake lever assembly, a reciprocal and rotary brake actuating rod, a sleeve substantially fixedly mounted adjacent one end of said rod, a tubular housing pivotally mounted coaxially with and in surrounding relation to the rod end and sleeve, a stop pin associated with the housing and sleeve to limit pivotal movement of the housing relative to the rod to a predetermined range, a torsion spring engaging at one end with the housing and at the other end with the rod and in surrounding relation to the rod within the housing between the sleeve and the rod end, said rod having a transverse endwise slot therein and an axial bore opening centrally of the end, said housing having opposed longitudinally extending internal guideways adjacent the rod end and a key having an abutment nose fitting into the rod end bore and having ears slidably and non-rotatably engaging said guideways, a compression spring bottomed in said rod end bore and engaging said abutment nose, said key being engageable in the transverse slot at the rod end to rotate the rod by rotating the housing to turn the key.

14. In combination in a safety straight pull brake lever assembly, a supporting structure, a pull rod reciprocably and rotatably supported by said supporting structure, means on said supporting structure and on said pull rod for retaining the pull rod in incremental rearwardly pulled brake setting positions and releasable by turning the rod, a handle carried by the rear end portion of the rod and attached thereto for normal rotation relative to the rod but held against relative longitudinal movement so that the handle is effective to pull the rod by manual rearward pulling force applied thereto, and selectively interengageable clutch means on the rod and on the handle and interengageable clutchingly through manual effort applied by the hand of the operator in engagement with the handle for effecting a releasable connection between the handle and the rod enabling turning of the rod by turning of the handle for releasing the rod from said retaining means.

15. In combination in a safety straight pull brake lever assembly, a supporting structure, a reciprocable and rotary member supported by said supporting structure, means on said supporting structure and on said member for maintaining the member in incremental rearwardly pulled brake setting positions and releasable by rotating said member, a handle carried by the rear end portion of said member and having a hub structure and a handle extending angularly to one side of said hub structure, said handle hub having a range of relative rotary movement with respect to said member, means normally biasing said hub structure into one relative rotary position with respect to the member, and selectively operable clutch means operative to interlock the handle hub structure and said member for joint rotation.

16. In combination in a safety straight pull brake lever assembly, a supporting structure, a reciprocable and rotary pull rod, means on said supporting structure and on said pull rod for maintaining the pull rod in incremental brake setting reciprocal position, a handle on said member including a laterally directed grasping portion and a hub portion which is relatively rotatably mounted on the rod, a normally disengaged safety clutch including a manually engageable member projecting outwardly from the hub and depressible for effecting a clutch connection between said hub and said rod, and a guard on said hub projecting outwardly in protective relation adjacent to said projecting member to guard against accidental actuation of said member except by a digit of the operator's hand.

RAY A. SANDBERG.

REFERENCES CITED

The following references are of record in the file of this patent:

UNITED STATES PATENTS

| Number | Name | Date |
|---|---|---|
| 370,707 | Lynch et al. | Sept. 27, 1887 |
| 1,162,935 | Lange | Dec. 7, 1915 |
| 1,964,509 | Fina | June 26, 1934 |
| 2,170,900 | Jandus et al. | Aug. 29, 1939 |
| 2,329,722 | Jandus | Sept. 21, 1943 |
| 2,498,651 | Crom | Feb. 28, 1950 |
| 2,501,008 | Schramm | Mar. 21, 1950 |
| 2,543,510 | Sandberg | Feb. 27, 1951 |

FOREIGN PATENTS

| Number | Country | Date |
|---|---|---|
| 49,012 | France | July 12, 1938 |
| 414,291 | France | Aug. 30, 1910 |
| 662,161 | Germany | July 18, 1938 |